United States Patent
Onufryk et al.

(10) Patent No.: US 7,353,345 B1
(45) Date of Patent: Apr. 1, 2008

(54) EXTERNAL OBSERVATION AND CONTROL OF DATA IN A COMPUTING PROCESSOR

(75) Inventors: Peter Zenon Onufryk, Flanders, NJ (US); Cesar Talledo, San Jose, CA (US)

(73) Assignee: Integated Device Technology, Inc., San Jose, CA (US)

( * ) Notice: Subject to any disclaimer, the term of this patent is extended or adjusted under 35 U.S.C. 154(b) by 396 days.

(21) Appl. No.: 11/075,049

(22) Filed: Mar. 7, 2005

(51) Int. Cl.
*G06F 13/14* (2006.01)

(52) U.S. Cl. .................................... 711/154
(58) Field of Classification Search ............... 711/118, 711/154; 714/30
See application file for complete search history.

(56) References Cited

U.S. PATENT DOCUMENTS

| | | | |
|---|---|---|---|
| 5,517,659 A | * | 5/1996 | Bourekas et al. ............. 712/39 |
| 5,586,279 A | * | 12/1996 | Pardo et al. .................... 711/3 |
| 5,636,363 A | * | 6/1997 | Bourekas et al. ............ 711/138 |
| 5,900,014 A | * | 5/1999 | Bennett ...................... 711/138 |
| 6,446,164 B1 | * | 9/2002 | Nguyen et al. ............. 711/118 |

* cited by examiner

*Primary Examiner*—Kevin L. Ellis
(74) *Attorney, Agent, or Firm*—Stanley J. Pawlik; Glass & Associates

(57) ABSTRACT

A processor access module receives a data command from an agent located externally of a computing processor and performs a cache operation on a cache memory in the computing processor based on the data command. Alternatively, the processor access module receives a data command from the agent and performs a cache operation on the cache memory based on the data command to store a computer program into the cache memory. The processor access module then receives a boot command from the agent and boots the computing processor to initiate execution of the computer program.

28 Claims, 2 Drawing Sheets

EXTERNAL OBSERVATION AND CONTROL OF DATA IN A COMPUTING PROCESSOR

BACKGROUND

1. Field of the Invention

The present invention relates generally to systems and methods of accessing data in a computing processor. More particularly, the present invention relates to accessing data in a cache memory of a computing processor to externally observe and control the data.

2. Background Art

Some prior art computing processors, such as a microprocessor, include a cache memory to reduce the access time to data during execution of computing instructions. In such a computing processor, the computing processor accesses data in a main memory external to the computing processor and stores the data into the cache memory. Because the access time to the data in the cache memory is faster than the access time to the data in the main memory, the computing processor subsequently accesses the data in the cache memory instead of the main memory. Further, if the computing processor modifies the data in the cache memory, the computing processor eventually stores the modified data into the main memory to maintain consistency between the data in the main memory and the data in the cache memory.

In these computing processors, data in the cache memory is not readily accessible externally of the computing processor. Although the computing processor can access the data in the cache memory, the data in the cache memory cannot be externally observed or controlled without executing computing instructions in the computing processor to make the data externally accessible. Moreover, the computing processor must access the computing instructions from the cache memory or the main memory before executing the computing instructions, which delays access to the data in the cache memory.

In light of the above, there exists a need for an improved system and method of externally accessing data in a cache memory of a computing processor.

SUMMARY OF THE INVENTION

A processor access module addresses the need for an improved system and method of externally accessing data in a cache memory of a computing processor. The processor access module receives a data command from an agent external to the computing processor and performs a cache operation on the cache memory based on the data command to access data in the cache memory. In this way, data in the cache memory of the computing processor is externally observable and controllable.

In a method in accordance with one embodiment of the present invention, a data command is received from an agent external to a computing processor. Access to a cache memory in the computing processor is obtained in response to the data command, and a cache operation is performed on the cache memory based on the data command. In another embodiment, a computer program product includes computer program code for performing the method.

A system, in accordance with one embodiment of the present invention, includes a slave bus controller and a cache operation controller. The slave bus controller is configured to receive a data command from an agent external to a computing processor. The cache operation controller is configured to obtain access to a cache memory in the computing processor in response to the data command and to perform a cache operation on the cache memory based on the data command.

DETAILED DESCRIPTION OF THE EMBODIMENTS

A processor access module, in accordance with one embodiment, receives a data command from an agent external to a computing processor and performs a cache operation on a cache memory in the computing processor based on the data command. The cache operation may involve storing data into the cache memory or retrieving data from the cache memory. In another embodiment, the processor access module stores a computer program into the cache memory based on the data command. In this embodiment, the processor access module receives a boot command from the agent and boots the computing processor in response to the boot command to initiate execution of the computer program stored in the cache memory.

Figure 1:
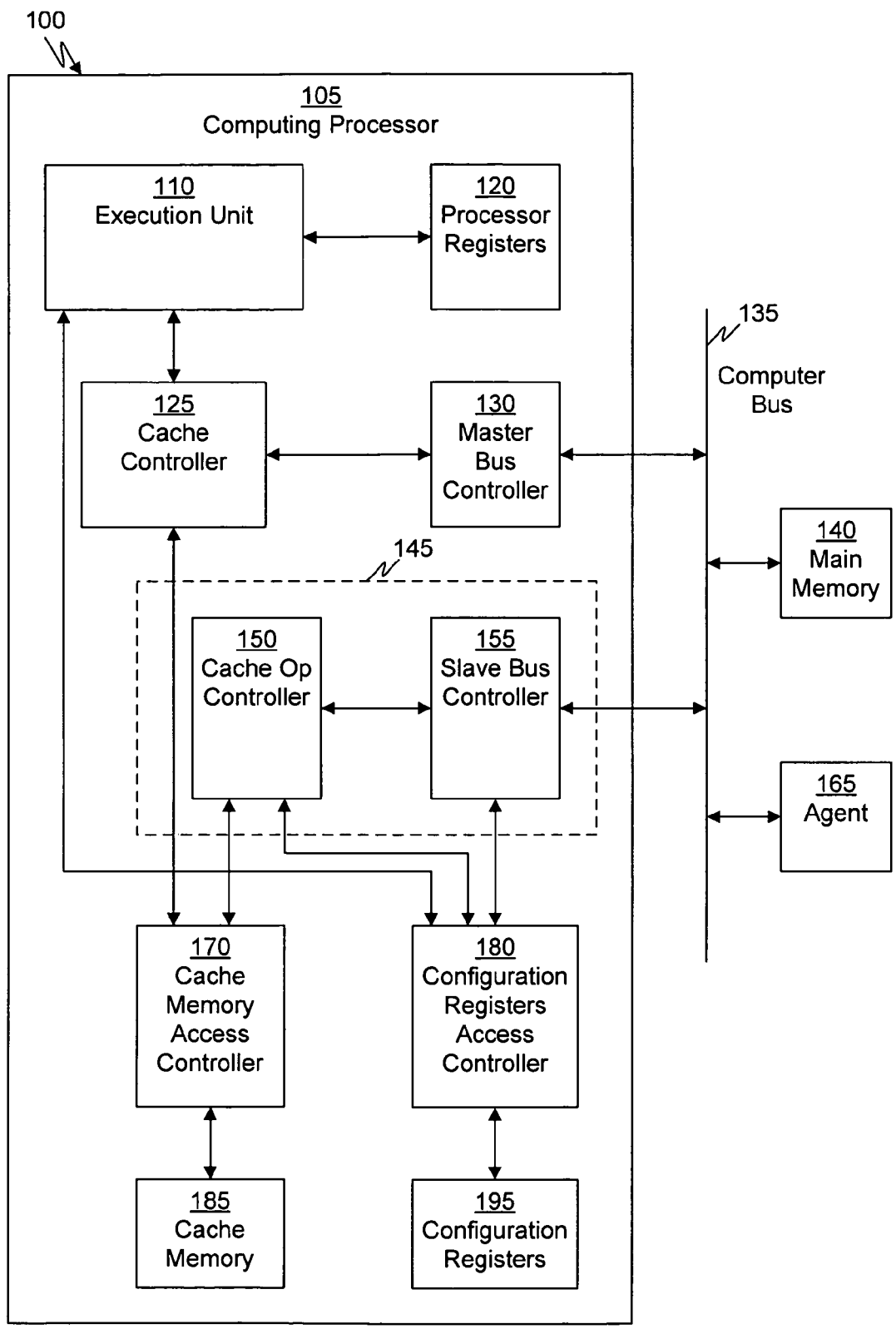
FIG. 1 is a block diagram of an exemplary computing environment in which a processor access module, in accordance with one embodiment of the present invention, can be practiced.

FIG. 1 depicts an exemplary computing environment 100 in which a processor access module 145, in accordance with one embodiment of the present invention, can be practiced. The exemplary computing environment 100 includes an exemplary computing processor 105, a main memory 140, and an agent 165 external to the computing processor 105. The computing processor 105, the main memory 140, and the agent 165 are coupled in communication with each other via a computer bus 135. The agent 165 provides commands to the computing processor 105 for accessing data in the computing processor 105 (i.e., retrieving data from the computing processor 105 or storing data or a computer program into the computing processor 105), as is described more fully herein. For example, the agent 165 can be another computing processor 105 coupled in communication with the computer bus 135. In one embodiment, the computing processor 105 is embodied in an integrated circuit. For example, the computing processor 105 can be a microprocessor, a microcontroller, an embedded processor, or an embedded controller, among other possibilities.

The exemplary computing processor 105 shown in FIG. 1 includes an execution unit 110 and a collection of processor registers 120 coupled in communication with the execution unit 110. The execution unit 110 executes computing instructions in the computing processor 105 and the processor registers 120 store data for the execution unit 110. The exemplary computing processor 105 also includes a cache controller 125, a master bus controller 130, a cache memory access controller 170, and a cache memory 185. The cache controller 125 is coupled in communication with the execution unit 110, the master bus controller 130, and the cache memory access controller 170. Further, the master bus controller 130 is coupled in communication with the computer bus 135, and the cache memory access controller 170 is coupled in communication with the cache memory 185. The cache memory access controller 170 controls access from the cache controller 125 to the cache memory 185, as is described more fully herein.

The cache controller 125 receives a data request from the execution unit 110 and accesses data in the main memory 140 or the cache memory 185, or both, based on the data request. In one exemplary computing processor 105, the cache controller 125 stores data from the data request into the main memory 140 via the master bus controller 130 or into the cache memory 185 via the cache memory access controller 170. In another exemplary computing processor 105, the cache controller 125 retrieves data from the main memory 140 via the master bus controller 130 or from the cache memory 185 via the cache memory access controller 170 and provides the data to the execution unit 110. In still another exemplary computing processor 105, the cache controller 125 retrieves data from the main memory 140 via the master bus controller 130 and stores the data into the cache memory 185 via the cache memory access controller 170.

The exemplary computing processor 105 also includes a configuration registers access controller 180 and a collection of configuration registers 195. The configuration registers 195 store control and status information for the computing processor 105. In one exemplary computing processor 105, the configuration registers access controller 180 is coupled in communication with the execution unit 110 and the configuration registers 195. In this exemplary computing processor 105, the configuration registers access controller 180 controls access from the execution unit 110 to the configuration registers 195, as is described more fully herein.

The processor access module 145 processes commands received from the agent 165 and performs operations on the cache memory 185 based on the commands. In this way, the agent 165 can externally observe and control data in the cache memory 185 without the need for executing computing instructions in the execution unit 110. In one embodiment, the processor access module 145 includes a cache operation controller (cache op controller) 150 and a slave bus controller 155. The cache operation controller 150 is coupled in communication with the cache memory access controller 170 and the slave bus controller 155 is coupled in communication with the computer bus 135. In this embodiment, the cache memory access controller 170 controls access from both the cache controller 125 and the cache operation controller 150 to the cache memory 185. In one further embodiment, the cache operation controller 150 is further coupled in communication with the slave bus controller 155. In another further embodiment, the cache operation controller 150 is coupled in communication with the configuration registers access controller 180, and the slave bus controller 155 is coupled in communication with the configuration registers access controller 180.

The slave bus controller 155 receives commands from the agent 165 via the computer bus 135. In one embodiment, the slave bus controller 155 receives a data command from the agent 165 and provides the data command to the cache operation controller 150. In response to receiving the data command from the slave bus controller 155, the cache operation controller 150 performs a cache operation on the cache memory 185 based on the data command, as is described more fully herein. In another embodiment, the slave bus controller 155 receives a data command from the agent 165, obtains access to the configuration registers 195 from the configuration registers access controller 180, and stores the data command into the configuration registers 195 via the configuration registers access controller 180. In this embodiment, the cache operation controller 150 performs a cache operation on the cache memory 185 based on the data command stored in the configuration registers 195, as is described more fully herein.

The cache operation controller 150 performs cache operations on the cache memory 185 based on the data commands. In one embodiment, the cache operation controller 150 receives a data command from the slave bus controller 155, obtains access to the cache memory 185 from the cache memory access controller 170 in response to receiving the data command, and performs a cache operation on the cache memory 185 via the cache memory access controller 170 based on the data command. The cache operation may involve storing data from the data command into the cache memory 185 or retrieving data from the cache memory 185 and providing the data to the agent 165 or some other destination via the slave bus controller 155. Alternatively, the cache operation may involve modifying one or more attribute fields of a cache line in the cache memory 185, such as a valid bit or a dirty bit. Further, the cache operation may involve modifying a cache line tag in the cache memory 185.

In another embodiment, the cache operation controller 150 monitors the configuration registers 195, detects a data command stored in the configuration registers 195, obtains access to the cache memory 185 via the cache memory access controller 170, and performs a cache operation on the cache memory 185 based on the data command. In this embodiment, the cache operation can include storing data from the configuration registers 195 (e.g., data in the data command stored in the configuration registers 195) into the cache memory 185 or retrieving data from the cache memory 185 and storing the data into the configuration registers 195.

In one embodiment, the cache operation controller 150 is capable of performing one or more of the cache operations defined by the MIPS32 Instruction Set Architecture (ISA). The MIPS32 ISA is described in "MIPS32™ Architecture for Programmers, Volume II: The MIPS32™ Instruction Set," Document Number MD00086, Revision 0.95, Mar. 12, 2001, which is incorporated herein by reference. For example, the cache operation controller 150 can perform a cache fill operation based on the data command to fill the cache memory 185 with data from the main memory 140 at a memory address of the main memory 140 specified in the data command. As a further example, the data can include a computer program.

In one embodiment, the configuration registers access controller 180 allows the execution unit 110 to access the configuration registers 195 when the execution unit 110 is executing computing instructions and allows the slave bus controller 155 and the cache operation controller 150 to access the configuration registers 195 when the execution unit 110 is not executing computing instructions. In another embodiment, the execution unit 110 sets a run bit in the configuration registers 195 to indicate that the execution unit 110 is executing a computing instruction and clears the run bit to indicate that the execution unit 110 is not executing a computing instruction. In this embodiment, the configuration registers access controller 180 prevents the cache operation controller 150 and the slave bus controller 155 from accessing the configuration registers 195 when the run bit is set.

In one further embodiment, the cache memory access controller 170 allows the cache controller 125 to access the cache memory 185 and prevents the cache operation controller 150 from accessing the cache memory 185 when the execution unit 110 is executing computing instructions. In this embodiment, the cache memory access controller 170 prevents the cache controller 125 from accessing the cache memory 185 and allows the cache operation controller 150 to access the cache memory 185 when the execution unit 110 is not executing computing instructions.

In another further embodiment, the cache memory access controller 170 allows the cache controller 125 to the access cache memory 185 and prevents the cache operation controller 150 from accessing the cache memory 185 when the run bit is set. In this embodiment, the cache memory access controller 170 prevents the cache controller 125 from accessing the cache memory 185 and allows the cache operation controller 150 to access the cache memory 185 when the run bit is clear.

In one embodiment, the slave bus controller 155 receives a boot command from the agent 165 via the computing bus 135 and boots the computing processor 105 in response to receiving the boot command. In a further embodiment, the slave bus controller 155 stores the boot command into the configuration registers 195 via the configuration registers access controller 180 to boot the computing processor 105. In this further embodiment, the slave bus controller 155 sets a reset bit in the configuration registers 195 to boot the computing processor 105, and the computing processor 105 clears the reset bit once the computing processor 105 is booted. In various embodiments, the execution unit 110 initiates execution of a computer program (i.e., computing instructions) stored in the cache memory 185 in response to the computing processor 105 being booted. In one embodiment, the boot command indicates a memory address of the computer program stored in the cache memory 185. In this embodiment, the computing processor 105 initiates execution of the computer program at the memory address in response to the computing processor 105 being booted.

In various embodiments, the processor access module 145 can include more than one cache operation controller 150, cache memory access controller 170, and cache memory 185. For example, the processor access module 145 may include one cache operation controller 150 dedicated to a data cache memory 185 in the computing processor 105 and another cache operation controller 150 dedicated to an instruction cache memory 185 in the computing processor 105. In a further embodiment, the cache operation controller 150 and the slave bus controller 155 can access the data cache memory 185 when the execution unit 110 is executing computing instructions. In this way, the execution unit 110 and the agent 165 can share data in the data cache memory 185 when the execution unit 110 is executing computing instructions.

Although the exemplary computing processor 105 depicted in FIG. 1 includes the cache operation controller 150 and the slave bus controller 155, it is to be appreciated that the cache operation controller 150 or the slave bus controller 155, or both, can be external to the computing processor 105 in various embodiments. For example, the computing processor 105 may be contained in an integrated circuit of one computer chip, and the slave bus controller 155 can be contained in an integrated circuit of another computer chip.

In one embodiment, the processor access module 145 is a hardware module. Examples of a hardware module include a combinational logic circuit, a sequential logic circuit, a programmable logic device, and a computing device, among others. In another embodiment, the processor access module 145 includes one or more software modules. Examples of a software module include a computer program, a software routine, binary code, and firmware, among others. Another example of a software module is a computer program product, such as a compact disc read-only memory (CD-ROM) or a memory storage device, containing computer program code. In still another embodiment, the processor access module 145 includes both hardware and software modules.

Figure 2:
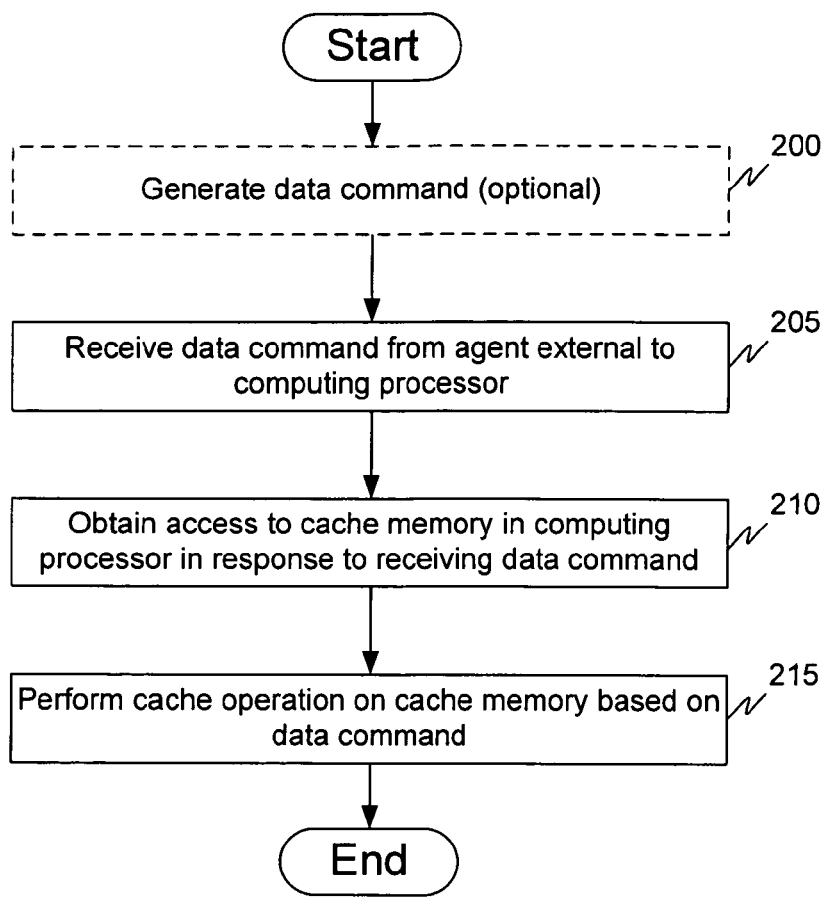
FIG. 2 is a flow chart of a method of accessing data in the computing processor, in accordance with one embodiment of the present invention.

FIG. 2 depicts a flow chart for a method of accessing data in the computing processor 105 (FIG. 1), in accordance with an embodiment of the present invention. In step 200, the agent 165 (FIG. 1) external to the computing processor 105 generates a data command for performing a cache operation on the cache memory 185 (FIG. 1) of the computing processor 105. It is to be appreciated that step 200 is optional in the present invention and that an entity external to the computing processor 105 other than the agent 165 can generate the data command in various embodiments.

In step 205, the slave bus controller 155 receives the data command from the agent 165 via the computing bus 135 (FIG. 1). In one embodiment, the slave bus controller 155 provides the data command to the cache operation controller 150 (FIG. 1). In another embodiment, the slave bus controller 155 stores the data command into the configuration registers 195 (FIG. 1) via the configuration registers access controller 180 (FIG. 1). In this embodiment, the cache operation controller 150 monitors, detects, and accesses the data command in the configuration registers 195 via the configuration registers access controller 180. In one embodiment, the cache operation controller 150 obtains access to the configuration registers 195 by sending an access request to the configuration registers access controller 180 and receiving an access grant from the configuration registers access controller 180 in response to the access request.

In step 210, the cache operation controller 150 obtains access to the cache memory 185 in response to the data command (e.g., in response to receiving the data command from the slave bus controller 155 or in response detecting the data command in the configuration registers 195). In one embodiment, the cache operation controller 150 obtains access to the cache memory 185 by sending an access request to the cache memory access controller 170 (FIG. 1) and receiving an access grant from the cache memory access controller 170 in response to the access request.

In step 215, the cache operation controller 150 performs a cache operation on the cache memory 185 (FIG. 1) based on the data command. In one embodiment, the cache operation controller 150 performs the cache operation on the cache memory 185 by storing data from the data command into the cache memory 185 via the cache memory access controller 170. In a further embodiment, the cache operation controller 150 provides an acknowledgement to the slave bus controller 155 indicating that the data is stored in the cache memory 185.

In another embodiment, the cache operation controller 150 performs the data command by retrieving data from the cache memory 185 via the cache memory access controller 180 and providing the data to the slave bus controller 155. In this embodiment, the slave bus controller 155 provides the data received from the cache operation controller 150 to the main memory 140 via the computer bus 135. In still another embodiment, the cache operation controller 150 performs the cache operation on the cache memory 185 by retrieving data from the main memory 140 via the slave bus controller 155 and the computer bus 135, and storing the data into the cache memory 185 via the cache memory access controller 170.

In another embodiment, the cache operation controller 170 performs the cache operation on the cache memory 185 by retrieving a block of data, such as a computer program, from the main memory 140 via the slave bus controller 155 and computer bus 135 and storing the computer program into the cache memory 185 via the cache memory access controller 170. In yet another embodiment, the cache operation controller 150 performs the cache operation on the cache memory 185 by retrieving a block of data from the cache memory 185 via the cache memory access controller 170 and storing the block of data into the main memory 140 via the slave bus controller 155 and the computer bus 135. In still another embodiment, the processor access module 145 repeats steps 200-215 to retrieve a computer program (e.g., data) from the main memory 140 via the slave bus controller 155 and computer bus 135 and stores the computer program (e.g., data) into the cache memory 185 via the cache memory access controller 170.

Figure 3:
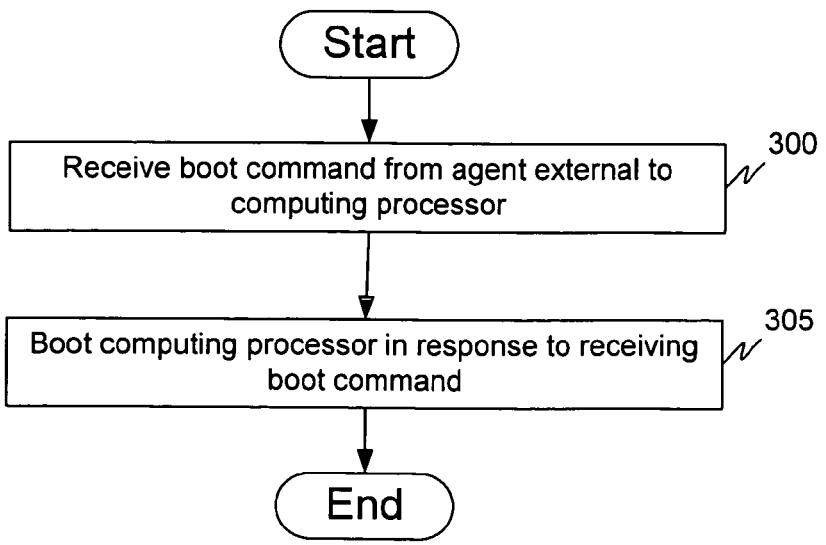
FIG. 3 is a flow chart of a portion of the method of accessing data in the computing processor, in accordance with another embodiment of the present invention.

FIG. 3 depicts a portion of a method for accessing data in the computing processor 105 (FIG. 1), in accordance with another embodiment of the present invention. It is to be appreciated that the method depicted in FIG. 3 is a continuation of the method depicted in FIG. 2 after the processor access controller 145 (FIG. 1) has stored a computer program into the cache memory 185 (FIG. 1) in step 215. In step 300, the slave bus controller 155 (FIG. 1) receives a boot command from the agent 165 (FIG. 1) via the computing bus 135 (FIG. 1).

In step 305, the slave bus controller 155 boots the computing processor 105 in response to receiving the boot command from the agent 165. In one embodiment, the slave bus controller 155 stores the boot command into the configuration registers 195 (FIG. 1) via the configuration registers access controller 180 (FIG. 1) to boot the computing processor 105. In a further embodiment, the slave bus controller 155 boots the computing processor 105 by setting a reset bit in the configuration registers 195. In this further embodiment, the computing processor 105 clears the reset bit once the computing processor 105 is booted. Also in step 305, the computing processor 105 initiates execution of the computer program in the cache memory 185 in response to the computing processor 105 being booted.

The embodiments discussed herein are illustrative of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. For a computing processor that includes a cache memory, an execution unit, a first cache controller operable for coupling data between the cache memory and the execution unit, and a second cache controller coupled to the cache memory, a method comprising:
   receiving in the second cache controller a data command from an agent external to the computing processor;
   obtaining access to the cache memory in response to the data command; and
   performing a cache operation on the cache memory based on the data command.

2. The method of claim 1, wherein performing a cache operation on the cache memory based on the data command comprises storing data from the data command into the cache memory.

3. The method of claim 1, wherein performing a cache operation on the cache memory based on the data command comprises retrieving data from the cache memory and providing the data to the agent.

4. The method of claim 1, wherein performing a cache operation on the cache memory based on the data command comprises:
   retrieving data from a main memory external to the computing processor; and
   storing the data retrieved from the main memory into the cache memory.

5. The method of claim 1, wherein performing a cache operation on the cache memory based on the data command comprises:
   retrieving data from the cache memory; and
   storing the data retrieved from the cache memory into a main memory external to the computing processor.

6. The method of claim 1, wherein the second cache controller is operable, upon receiving the data command, to obtain access to the cache memory and wherein the performing a cache operation on the cache memory based on the data command is performed by the second cache controller.

7. The method of claim 1, wherein the computing processor further includes a master bus controller coupled to the first cache controller and a slave bus controller that is coupled to the second cache controller for coupling the second cache controller to an external data bus, and wherein receiving in the second cache controller a data command from an agent external to the computing processor further comprises receiving the data command at the slave bus controller, the slave bus controller operable to couple the data command to the second cache controller.

8. The method of claim 1, wherein obtaining access to the cache memory in response to the data command does not require stalling of the execution unit.

9. The method of claim 1, wherein performing a cache operation on the cache memory based on the data command comprises storing a computer program into the cache memory, the method further comprising:
   receiving a boot command from the agent; and
   booting the computing processor in response to the boot command to initiate execution of the computer program.

10. The method of claim 9, wherein the boot command indicates a memory address for the computer program, and wherein booting the computing processor in response to the boot command initiates execution of the computer program at the memory address.

11. The method of claim 1, wherein obtaining access to the cache memory in the computing processor in response to the data command comprises:
   sending an access request from the second cache controller to a cache memory access controller in response to the data command; and
   receiving at the second cache controller an access grant from the cache memory access controller in response to the access request.

12. The method of claim 1, further comprising:
   receiving in the second cache controller a plurality of data commands from the agent;
   obtaining access to the cache memory in response to each data command of the plurality of data commands;

performing a cache operation on the cache memory based on each data command of the plurality of data commands to store a computer program into the cache memory;
receiving a boot command from the agent; and
booting the computing processor in response to the boot command to initiate execution of the computer program.

13. The method of claim 1, wherein performing a cache operation on the cache memory based on the data command comprises modifying an attribute field of a cache line in the cache memory.

14. The method of claim 1, wherein performing a cache operation on the cache memory based on the data command comprises modifying a cache line tag in the cache memory.

15. A system comprising:
a computer bus;
a memory device coupled to the computer bus; and
a computing processor that includes:
an execution unit;
a master bus controller coupled to the computer bus;
cache memory;
a first cache controller coupled to the execution unit and the master bus controller, the first cache controller operable for coupling data between the cache memory and the execution unit and operable for coupling data between the cache memory and the master bus controller;
a slave bus controller coupled to the computer bus and configured to receive a data command from an agent external to the computing processor; and
a second cache operation controller coupled to the slave bus controller, the second cache controller configured to obtain access to the cache memory in response to the data command and to perform a cache operation on the cache memory based on the data command.

16. The system of claim 15, wherein the cache operation comprises storing a computer program into the cache memory, the slave bus controller further configured to receive a boot command from the agent and to boot the computing processor in response to the boot command to initiate execution of the computer program.

17. The system of claim 16, wherein the boot command indicates a memory address for the computer program, and wherein the slave bus controller is further configured to boot the computing processor in response to the boot command to initiate execution of the computer program at the memory address.

18. The system of claim 15, wherein the slave bus controller is further configured to receive a plurality of data commands from the agent, and the second cache controller is further configured to perform a cache operation on the cache memory based on each data command of the plurality of data commands to store a computer program into the cache memory, the slave bus controller further configured to receive a boot command from the agent and to boot the computing processor in response to the boot command to initiate execution of the computer program.

19. The system of claim 15, wherein the cache memory is a data cache memory.

20. The system of claim 15, wherein the cache memory is an instruction cache memory.

21. The system of claim 15, wherein the computing processor is a microprocessor embodied in an integrated circuit.

22. The system of claim 15, wherein the second cache controller performs the cache operation on the cache memory by modifying an attribute field of a cache line in the cache memory.

23. The system of claim 15, wherein the second cache controller performs the cache operation on the cache memory by modifying a cache line tag in the cache memory.

24. A computing processor comprising:
a cache memory;
a cache memory access controller coupled in communication with the cache memory and configured to control access to the cache memory; and
a processor access module that includes a cache operation controller and a slave bus controller, the cache operation controller coupled in communication with the cache memory access controller and the slave bus controller, the slave bus controller configured to receive a data command from an agent located externally of the computing processor and provide the data command to the cache operation controller, the cache operation controller configured to obtain access to the cache memory via the cache memory access controller and perform a cache operation on the cache memory based on the data command.

25. The computing processor of claim 24, wherein the cache operation comprises storing a computing program into the cache memory, and wherein the processor access module is further configured to receive a boot command from the agent and to boot the computing processor in response to the boot command to initiate execution of the computing program.

26. The computing processor of claim 24, further comprising a first cache controller coupled to an execution unit and a master bus controller, the first cache controller operable for coupling data between the cache memory and the execution unit and operable for coupling data between the cache memory and the master bus controller.

27. A computing processor comprising:
a cache memory;
a cache memory access controller coupled in communication with the cache memory and configured to control access to the cache memory; and
a processor access module that includes a cache operation controller and a slave bus controller, the cache operation controller coupled in communication with the cache memory access controller and the slave bus controller, the slave bus controller coupled in communication with an agent located externally of the computing processor and configured to receive a data command from the agent and provide the data command to the cache operation controller, the cache operation controller configured to obtain access to the cache memory via the cache memory access controller in response to receiving the data command from the slave bus controller and to perform a cache operation on the cache memory via the cache memory access controller based on the data command.

28. A computing processor comprising:
a cache memory;
a cache memory access controller coupled in communication with the cache memory and configured to control access to the cache memory;
a collection of configuration registers;
a configuration registers access controller coupled in communication with the configuration registers; and
a processor access module that includes a cache operation controller and a slave bus controller, the cache operation controller coupled in communication with the cache memory access controller and the configuration registers access controller, the slave bus controller coupled in communication with the configuration registers access controller and an agent located externally of the computing processor, the processor access module configured to receive a data command from the agent, obtain access to the configuration registers via the configuration registers access controller, and store the data command into the configurations registers via the configuration registers access controller, the cache operation controller configured to obtain access to the configuration registers via the configuration registers access controller, detect the data command in the configuration registers via the configuration registers access controller, and obtain access to the cache memory via the cache memory access controller in response to detecting the data command in the configuration registers, the cache operation controller further configured to perform a cache operation on the cache memory via the cache memory access controller based on the data command.

* * * * *

UNITED STATES PATENT AND TRADEMARK OFFICE
CERTIFICATE OF CORRECTION

PATENT NO. : 7,353,345 B1  
APPLICATION NO. : 11/075049  
DATED : April 1, 2008  
INVENTOR(S) : Onufryk et al.

Page 1 of 1

It is certified that error appears in the above-identified patent and that said Letters Patent is hereby corrected as shown below:

Claim 15, line 17 the phrase "second cache operation controller" should read --second cache controller--.

Signed and Sealed this

Fourteenth Day of October, 2008

JON W. DUDAS  
*Director of the United States Patent and Trademark Office*

UNITED STATES PATENT AND TRADEMARK OFFICE
CERTIFICATE OF CORRECTION

PATENT NO. : 7,353,345 B1  
APPLICATION NO. : 11/075049  
DATED : April 1, 2008  
INVENTOR(S) : Onufryk et al.

Page 1 of 1

It is certified that error appears in the above-identified patent and that said Letters Patent is hereby corrected as shown below:

Column 9, Claim 15, line 33 the phrase "second cache operation controller" should read --second cache controller--.

This certificate supersedes the Certificate of Correction issued October 14, 2008.

Signed and Sealed this

Fourth Day of November, 2008

JON W. DUDAS  
*Director of the United States Patent and Trademark Office*